US012802251B2

(12) United States Patent
Liu et al.

(10) Patent No.: US 12,802,251 B2
(45) Date of Patent: Nov. 17, 2026

(54) METHOD FOR IDENTIFYING DEPTHS OF IMAGES AND RELATED DEVICE

(71) Applicant: HON HAI PRECISION INDUSTRY CO., LTD., New Taipei (TW)

(72) Inventors: Tsung-Wei Liu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 329 days.

(21) Appl. No.: 18/398,512

(22) Filed: Dec. 28, 2023

(65) Prior Publication Data

US 2024/0221200 A1 Jul. 4, 2024

(30) Foreign Application Priority Data

Dec. 30, 2022 (CN) ........................ 202211737780.9

(51) Int. Cl.
*G06T 7/55* (2017.01)
*G06F 17/16* (2006.01)
(Continued)

(52) U.S. Cl.
CPC ................ *G06T 7/55* (2017.01); *G06F 17/16* (2013.01); *G06T 3/4046* (2013.01); *G06T 7/70* (2017.01);
(Continued)

(58) Field of Classification Search
CPC . G06T 7/05; G06T 2207/10028; G06T 17/00; G06T 7/73; G06T 7/74;
(Continued)

(56) References Cited

U.S. PATENT DOCUMENTS

| | | | | |
|---|---|---|---|---|
| 12,046,002 | B1 * | 7/2024 | Nie | G06T 7/73 |
| 2022/0198693 | A1 * | 6/2022 | Li | G06T 7/579 |

(Continued)

FOREIGN PATENT DOCUMENTS

| | | | |
|---|---|---|---|
| CN | 114842438 | A | 8/2022 |
| CN | 115223123 | A | 10/2022 |

OTHER PUBLICATIONS

Qin, H., Li, X., Wang, Y., Zhang, Y., & Dai, Q. (2016). Depth estimation by parameter transfer with a lightweight model for single still images. IEEE Transactions on Circuits and Systems for Video Technology, 27(4), 748-759. (Year: 2016).*

*Primary Examiner* — Andrew W Bee
*Assistant Examiner* — Emma E Dryden
(74) *Attorney, Agent, or Firm* — ScienBiziP, P.C.

(57) ABSTRACT

A method for identifying depths of images is provided. In the method, the computer device obtains point clouds of a road scene and a spatial coordinate value of each point in the point clouds. An initial depth image is obtained by inputting the first image into a preset depth identification network. A projected depth value and a projected coordinate value are obtained by converting the spatial coordinate value, and a target depth value is calculated. An initial projection image is generated based on the target depth value and a second image. A loss value is calculated according to the first image, the initial projection image and the second image, and a pre-trained image identification model is obtained by adjusting the preset depth identification network. By performing the method, measurement unit information of depth information of images can be determined.

14 Claims, 4 Drawing Sheets

(51) Int. Cl.
*G06T 3/4046* (2024.01)
*G06T 7/70* (2017.01)
*G06T 7/73* (2017.01)

(52) U.S. Cl.
CPC ...... *G06T 7/75* (2017.01); *G06T 2207/10028* (2013.01); *G06T 2207/20081* (2013.01); *G06T 2207/20084* (2013.01); *G06T 2207/30252* (2013.01)

(58) Field of Classification Search
CPC ........... G06T 7/55; G06T 3/4046; G06T 7/75; G06T 2207/20084; G06T 7/70; G06T 2207/30252; G06V 20/64; G06F 17/16; G06N 3/08
See application file for complete search history.

(56) References Cited

U.S. PATENT DOCUMENTS

2023/0145498 A1* 5/2023 Zhao ..................... G06T 3/4046
382/162
2024/0177329 A1* 5/2024 Cai ....................... G06T 3/4046

* cited by examiner

METHOD FOR IDENTIFYING DEPTHS OF IMAGES AND RELATED DEVICE

FIELD

The present application relates to a technical field of image processing, and more particularly to a method for identifying depths of images and related devices.

BACKGROUND

In a current method for depth identification of vehicle images, depth information with measurement units cannot be identified through an image recognition model. It is difficult to determine an accurate distance between a vehicle and various objects or obstacles in the surrounding environment, thereby affecting driving safety.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
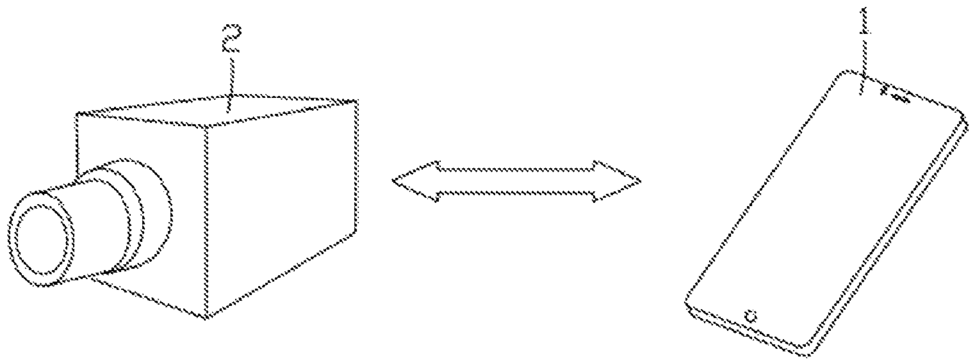
FIG. 1 is an environment diagram in an embodiment of the present disclosure.

FIG. 1 is an environment diagram in an embodiment of the present disclosure. In one embodiment, a method for training image identification models and a method for identifying depths of images can be applied to one or more computer devices 1. As shown in FIG. 1, the computer device 1 communicates with a camera device 2, and the camera device 2 can be a monocular camera or other device that can be used to capture images. The computer device 1 and the camera device 2 shown in FIG. 1 are examples, it is not limited in practical application.

The computer device 1 may include hardware such as, but is not limited to, a microprocessor and an Application Specific Integrated Circuit (ASIC), a Field-Programmable Gate Array (FPGA), a Digital Signal Processor (DSP), and embedded devices, for example.

The computer device 1 may be any electronic equipment that can interact with a user, such as a personal computer, a tablet computer, a smart phone, a personal digital assistant (PDA), a game console, and an interactive network television, Internet Protocol Television (IPTV), or smart wearable devices, for example.

The computer device 1 may also include a network device and/or a user device. The network device includes, but is not limited to, a single network server, a server group composed of multiple network servers, or a cloud including a large number of hosts or network servers based on a cloud computing technology.

A network can include, but is not limited to, the Internet, a wide area network (WAN), a metropolitan area network, a local area network, and a virtual private network (VPN), for example.

Figure 2:
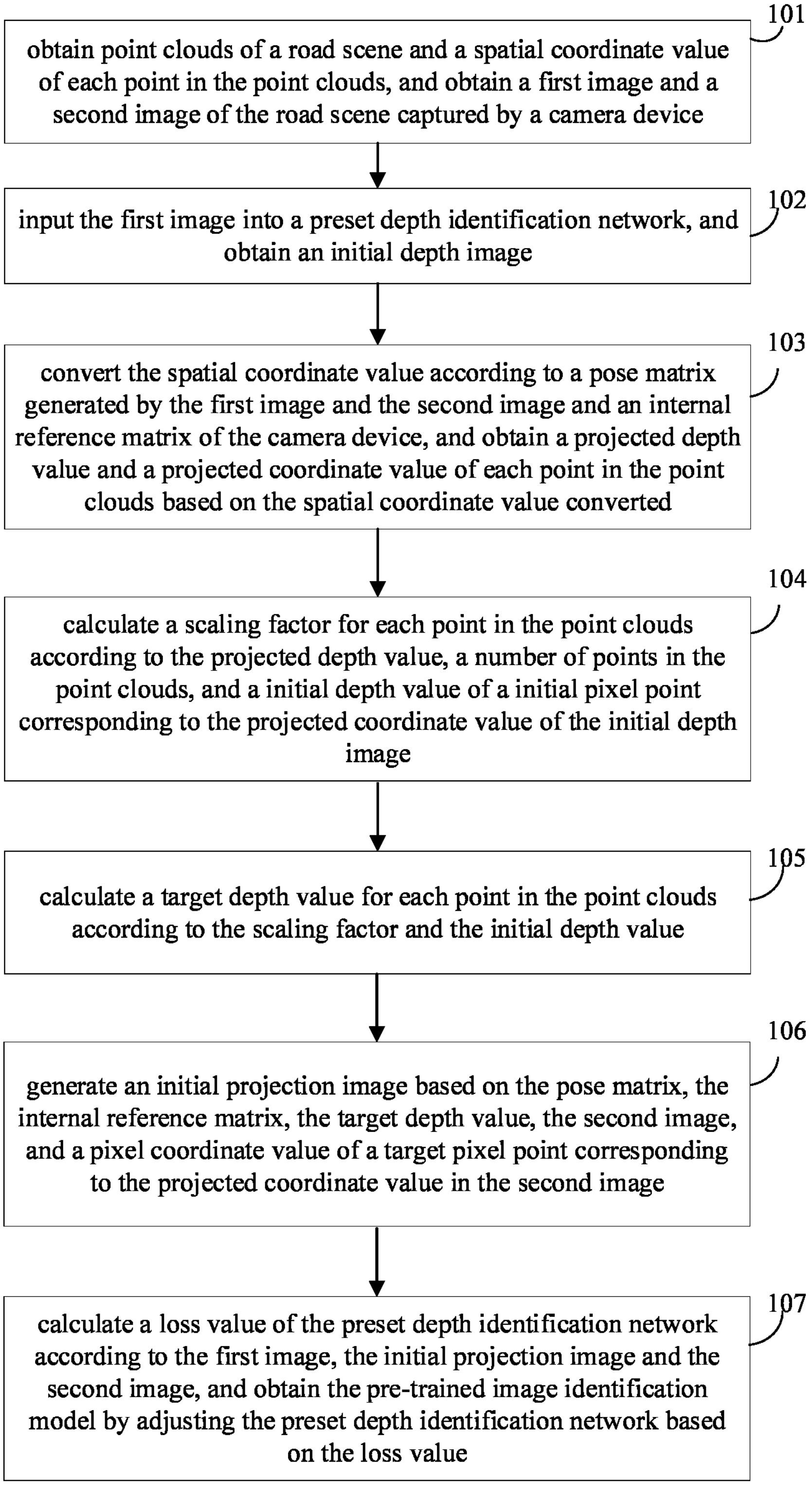
FIG. 2 is a flowchart diagram of a method for training image identification models in an embodiment of the present disclosure.

FIG. 2 is a flowchart diagram of a method for training image identification models in an embodiment of the present disclosure. According to different needs, an order of the steps in the flowchart can be adjusted based on actual requirements, and some steps can be omitted. The method can be performed by a computer device, such as the computer device 1 shown in FIG. 1.

In block S101, the computer device obtains point clouds of a road scene and a spatial coordinate value of each point in the point clouds, and the computer device obtains a first image and a second image of the road scene captured by a camera device.

In one embodiment, the point clouds and the spatial coordinate value of each point in the point clouds can be obtained by scanning the road scene with a lidar. Measurement unit information of the lidar may include, but is not limited to meters or centimeters. The road scene represents a scene that shows multiple objects, such as vehicles, ground, pedestrians, sky, trees, and so on. The camera device can be a monocular camera, and the first image and the second image are Red Green Blue (RGB) images of adjacent frames. Generation time of the second image is later than generation time of the first image. For example, a timestamp of the second image is later than a timestamp of the first image.

In one embodiment, the computer device obtains the first image by controlling the camera device to capture the road scene, and then the camera device captures the road scene again after a preset time interval, and the computer device obtains the second image. The preset time interval can be preset to be short, for example, the preset time interval can be 10 ms. Due to a short duration of the preset time interval, a distance that objects in the road scene can move slightly within the preset time interval. Therefore, the second image and the first image include more identical objects.

In block S102, the computer device inputs the first image into a preset depth identification network, and obtains an initial depth image.

In one embodiment, the preset depth identification network can be one or more depth identification network frameworks. For example, the preset depth identification network frameworks can be FCRN (Fully Convolutional Recurrent Network) framework, FCN (Fully Convolutional Network) framework, U-net framework, and so on. The preset depth identification network includes convolution layers, batch normalization layers, pooling layers, and activation function layers, for example. A generation process of the initial depth image can be referred to a generation process of a target depth image as provided below.

In block S103, the computer device converts the spatial coordinate value according to a pose matrix generated by the first image and the second image and an internal reference matrix of the camera device, and the computer device obtains a projected depth value and a projected coordinate value of each point in the point clouds based on the spatial coordinate value converted.

In one embodiment, the pose matrix refers to a conversion relationship between a camera coordinate system corresponding to the camera device and a world coordinate system. The world coordinate system refers to a coordinate system established according to any object in real world, and the world coordinate system can reflect a real position of the any object in real world. For example, the world coordinate system may be a coordinate system corresponding to the lidar. The spatial coordinate value includes a horizontal space coordinate value, a vertical space coordinate value and a longitudinal space coordinate value. The projected depth value refers to a value obtained by converting the longitudinal space coordinate value based on the pose matrix and the internal reference matrix. The projected coordinate value refers to a coordinate value obtained by converting the horizontal space coordinate value and the vertical space coordinate value based on the pose matrix and the internal reference matrix.

In one embodiment, the computer device obtains a first homogeneous coordinate matrix of each pixel in the first image, and obtains a second homogeneous coordinate matrix of each pixel in the second image. The computer device obtains an inverse matrix of the internal reference matrix. The computer device calculates a first camera coordinate of each pixel in the first image according to the first homogeneous coordinate matrix and the inverse matrix, and calculates a second camera coordinate of each pixel in the second image according to the second homogeneous coordinate matrix and the inverse matrix. The computer device calculates the first camera coordinate and the second camera coordinate based on a preset relational of an epipolar constraint, and obtains a rotation matrix and a translation matrix. The computer device obtains the pose matrix by splices the rotation matrix and the translation matrix. The first homogeneous coordinate matrix refers to a matrix with dimension more than a pixel coordinate matrix, and an element value of the extra dimension is 1. The pixel coordinate matrix refers to a matrix generated according to a first pixel coordinate of each pixel in the first image, and the first pixel coordinate refers to a coordinate of each pixel in the first image in a pixel coordinate system. For example, the first pixel coordinate of any pixel in the first image in the pixel coordinate system is represented as (u, v), and the pixel coordinate matrix of any pixel is represented as $$\begin{bmatrix} u \\ v \end{bmatrix},$$

a homogeneous coordinate matrix of the any pixel is represented as $$\begin{bmatrix} u \\ v \\ 1 \end{bmatrix}.$$

The first camera coordinate refers to a camera coordinate of each pixel of the first image in the camera coordinate system corresponding to the camera device.

Figure 3:
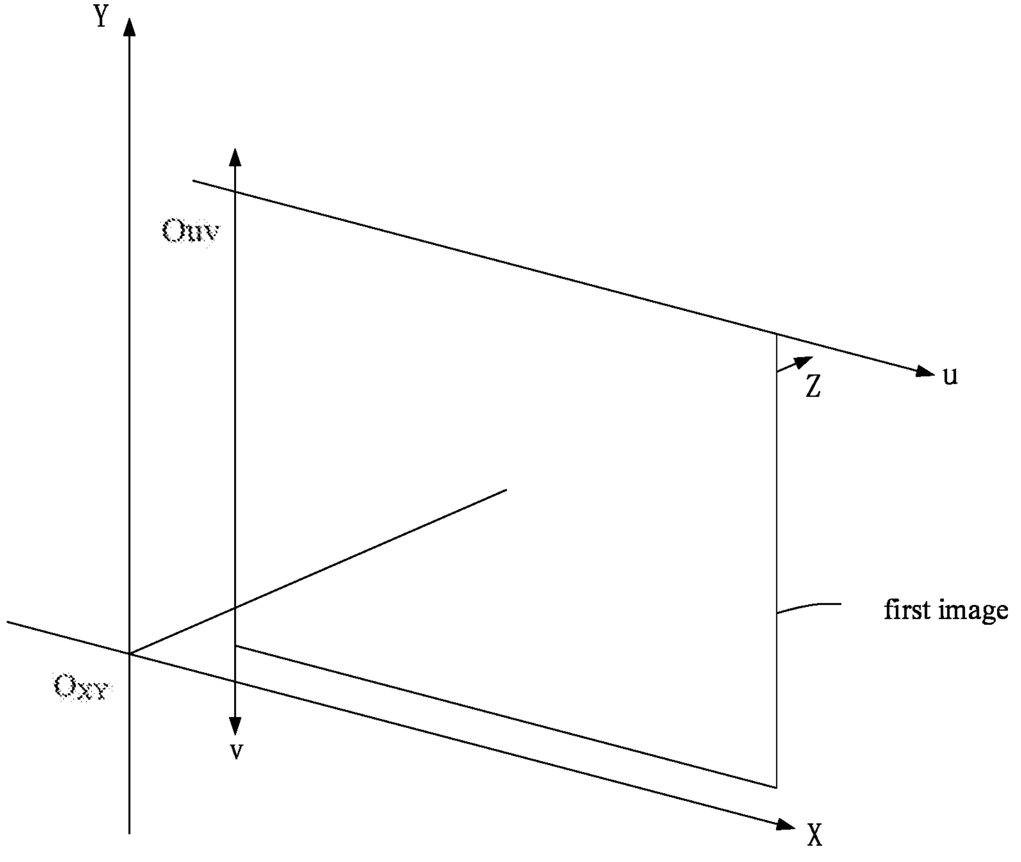
FIG. 3 is a schematic diagram of a pixel coordinate system and a camera coordinate system in an embodiment of the present disclosure.

FIG. 3 is a schematic diagram of a pixel coordinate system and a camera coordinate system in an embodiment of the present disclosure. The computer device constructs the pixel coordinate system by taking a pixel point Ouv in a first row and a first column of the first image as a origin, a parallel line where the pixel point Ouv in the first row is located as a u axis, and a vertical line where the pixel point Ouv in the first column is located as v axis. The computer device constructs the camera coordinate system by taking a light point $O_{XY}$ of the monocular camera as an origin, an optical axis of the monocular camera is represented as a Z axis, a line parallel to the u axis of the pixel coordinate system is represented as a X axis, and a line parallel to the v-axis of the pixel coordinate system is represented as a Y-axis.

In one embodiment, the computer device multiplies the first homogeneous coordinate matrix by the inverse matrix, and obtains the first camera coordinate. The computer device multiplies the second homogeneous coordinate matrix and the inverse matrix, and obtains the second camera coordinate. A generation method of the second homogeneous coordinate matrix is basically the same as a generation method of the first homogeneous coordinate matrix, it is not repeated here. The pose matrix can be expressed as:

$$\text{pose} = \begin{bmatrix} R & t \\ 0 & 1 \end{bmatrix},$$

in which pose represents the pose matrix, R represents the rotation matrix, and t represents the translation matrix. A calculation formula of the rotation matrix and the translation matrix is represented as: $K^{-1}\rho_1(txR)(K^{-}\rho_2)^T=0$, in which $K^{-1}\rho_1$ represents the first camera coordinate, $K^{-1}\rho_2$ represents the second camera coordinate, $\rho_1$ represents the first homogeneous coordinate matrix, $\rho_2$ represents the second homogeneous coordinate matrix, $K^{-1}$ represents the inverse matrix.

In one embodiment, the computer device obtains a camera coordinate matrix by multiplying a spatial homogeneous matrix corresponding to the spatial coordinate value by the pose matrix. The computer device determines a vertical coordinate value of the camera coordinate matrix as the projected depth value, and obtains a camera pose matrix by multiplying the camera coordinate matrix by the internal reference matrix. The computer device performs a division operation on each element value of the camera pose matrix by the projected depth value, and obtains the projected coordinate value. The spatial homogeneous matrix refers to a matrix with dimension more than a dimension of the spatial coordinate matrix, and an element value of an extra dimension is 1, and the spatial coordinate matrix refers to a matrix generated according to the spatial coordinate value. For example, the spatial coordinate value is (x, y, z), the spatial coordinate matrix is represented as $$\begin{bmatrix} x \\ y \\ z \end{bmatrix},$$

and the spatial homogeneous matrix is represented as $$\begin{bmatrix} x \\ y \\ z \\ 1 \end{bmatrix}.$$

By directly establishing pixel coordinate systems in the first image and the second image respectively, the pose matrix can be generated according to coordinates of each pixel in the first image and the second image in a corresponding pixel coordinate system, and the space coordinate value can be quickly converted.

In block S104, the computer device calculates a scaling factor for each point in the point clouds according to the projected depth value, a number of points in the point clouds, and an initial depth value of an initial pixel point corresponding to the projected coordinate value of the initial depth image.

In one embodiment, the scaling factor refers to an average value of ratios between a plurality of projected depth values and a plurality of corresponding initial depth values. In one embodiment, a calculation formula of the scaling factor is represented as:

$$C_{scale} = \frac{1}{N_r}\sum_{i=1}^{N_r}\frac{d_{ir}}{d_{ip}},$$

in which $C_{scale}$ represents the scaling factor, $N_r$ represents the number of points in the point clouds, $d_{ir}$ represents the projected depth value of any point in the point clouds, $d_{ip}$ represents the initial depth value of the initial pixel point corresponding to any point. By dividing the projected depth value of each point in the point clouds with the initial depth value of the initial pixel point corresponding to each point, a plurality of ratios are obtained. By selecting the average value of the plurality of ratios as the scaling factor, a rationality of the scaling factor can be improved. Since the projected depth value includes measurement unit information, the scaling factor can also include the measurement unit information.

In block S105, the computer device calculates a target depth value for each point in the point clouds according to the scaling factor and the initial depth value.

In one embodiment, a calculation formula of the target depth value is represented as: $D_t = C_{scale} * d_{ip}$, in which $D_t$ represents the target depth value, $C_{scale}$ represents the scaling factor, $d_{ip}$ represents the initial depth value. By multiplying the initial depth value of the initial pixel point corresponding to each point in the point clouds with the scaling factor, since pixel values of initial pixel points corresponding to all points in the point clouds are involved in a calculation operation, the target depth value of each point in the point clouds can have the same measurement unit information. In addition, since the number of points in the point clouds may be smaller than a number of pixels in the first image or the second image, the initial depth value of the initial pixel point corresponding to the projected coordinate value in the initial depth image can be accurately selected according to the projected depth value. Moreover, the projected depth value and the corresponding initial depth value can be accurately calculated.

In block S106, the computer device generates an initial projection image based on the pose matrix, the internal reference matrix, the target depth value, the second image, and a pixel coordinate value of a target pixel point corresponding to the projected coordinate value in the second image.

In one embodiment, the initial projection image refers to a projection image generated by remapping the second image back to the first image.

In one embodiment, the computer device constructs a homogeneous coordinate matrix according to the pixel coordinate value of the target pixel point, and obtains an inverse matrix of the internal reference matrix. The computer device calculates a target coordinate value of the target pixel point according to the pose matrix, the inverse matrix, the internal reference matrix, the homogeneous coordinate matrix and the target depth value. The computer device obtains the initial projection image by adjusting the pixel coordinate value of the target pixel point to be corresponding target coordinate value in the second image. The pixel coordinate value of the target pixel point refers to a coordinate value in the pixel coordinate system corresponding to the second image, and the pixel coordinate value of the target pixel point includes an abscissa value and an ordinate value. A calculation formula of the target coordinate value is represented as: $P = K * pose * Z * K^{-1} * H$, in which P represents the target coordinate value, K represents the internal reference matrix, pose represents the pose matrix, $K^{-1}$ represents the inverse matrix, H represents the homogeneous coordinate matrix, and Z represents the target depth value. Since the target depth value of each point in the point clouds has the same measurement unit information, it can be ensured that the pixel value in the initial projection image generated according to the target depth value includes the measurement unit information.

In block S107, the computer device calculates a loss value of the preset depth identification network according to the first image, the initial projection image and the second image, and obtains the pre-trained image identification model by adjusting the preset depth identification network based on the loss value.

In one embodiment, the pre-trained image identification model refers to a model generated after adjusting the preset depth identification network. The preset depth identification network may be a deep neural network, and the preset depth identification network may be obtained from a database on the Internet.

The computer device calculates a first pixel difference value between a pixel value of each of pixel points in the first image and a pixel value of corresponding pixel points in the initial projection image, and obtains a first difference image by adjusting the pixel value of each of pixel points in the first image to be corresponding first pixel difference value. The computer device calculates a second pixel difference value between the pixel value of each of pixel points in the first image and a pixel value corresponding to pixel points in the second image, and generates a second difference image corresponding to the first image according to the second pixel difference value. The computer device obtains a target image by adjusting the second pixel difference value of the second difference image according to a comparison result of the second pixel difference value with the corresponding first pixel difference value and a preset value, and the computer device calculates the loss value according to a pixel value of each of pixel points in the target image and the corresponding first pixel difference value of corresponding pixel points in the first difference image. A method for generating the second difference image is basically the same as a method for generating the first difference image, it is not repeated here.

Specifically, the computer device compares the second pixel difference value with the corresponding first pixel difference value. In response that the second pixel difference value is smaller than the corresponding first pixel difference value, the computer device determines a pixel point corresponding to the second pixel difference value in the second difference image as a feature pixel point. The computer device obtains the target image by adjusting a plurality of second pixel difference values corresponding to a plurality of feature pixel points in the second difference image to be the preset value. The preset value can be set or updated, which is not limited in this application. For example, the preset value may be zero. The computer device multiplies the pixel value of each of pixel points in the target image by the corresponding first pixel difference value of corresponding pixel points in the first difference image, and obtains the loss value.

In one embodiment, the computer device adjusts parameters of the preset depth identification network based on the loss value until the loss value drops to a configured value, and obtains the pre-trained image identification model. The parameters of the preset depth identification network include a learning rate, a batch size for each training, and so on.

In other embodiments, the computer device adjusts parameters of the preset depth identification network based on the loss value until the loss value satisfies a preset convergence condition, and obtains the pre-trained image identification model. The convergence condition can be set or updated, which is not limited in this application. For example, the convergence condition may be that the loss value is less than or equal to a preset threshold.

In the above embodiments, since a pixel value corresponding to a moving object will cause a calculated loss value to be inaccurate, by comparing the second pixel difference value with the corresponding first pixel difference value, it can be determined whether there is a moving object in the second difference image. If the second pixel difference value is smaller than the corresponding first pixel difference value, it is indicated that there is a movable object in the second difference image. By determining a pixel point corresponding to the second pixel difference value in the second difference image as the feature pixel point, and adjusting a plurality of second pixel difference values corresponding to a plurality of feature pixel points in the second difference image to be the preset value, and adjusting a pixel value of the pixel point corresponding to the moving object in the second difference image to be zero, it can be ensured that the pixel value corresponding to the moving object is not utilized to calculate the loss value, thereby ensuring an accuracy of the loss values.

Figure 4:
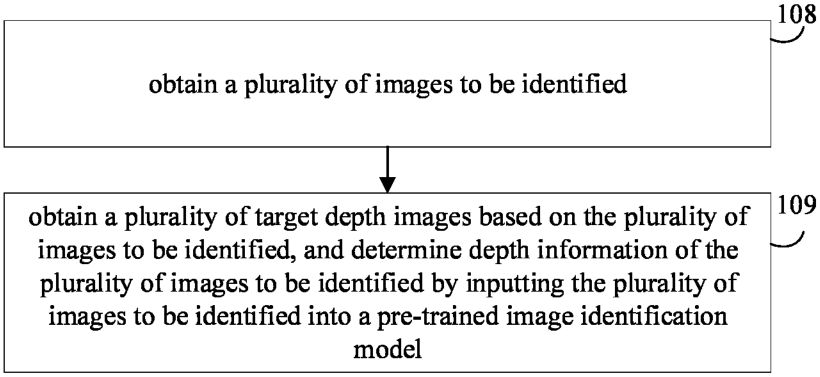
FIG. 4 is a flowchart diagram of a method for identifying depths of images in an embodiment of the present disclosure.

FIG. 4 is a flowchart diagram of a method for identifying depths of images in an embodiment of the present disclosure. According to different needs, the order of the steps in the flowchart can be adjusted based on actual testing requirements, and some steps can be omitted. The execution subject of the method is a computer device, such as the computer device 1 shown in FIG. 1.

In block S108, the computer device obtains a plurality of images to be identified.

In one embodiment, the plurality of images to be identified refers to images that need to be identified depth information. The computer device obtains the plurality of images to be identified from a preset database. The preset database may be KITTI database, Cityscapes database, vKITTI database and so on.

In block S109, the computer device obtains a plurality of target depth images based on the plurality of images to be identified, and determines depth information of the plurality of images to be identified by inputting the plurality of images to be identified into a pre-trained image identification model.

In one embodiment, the plurality of target depth images refer to images including depth information of each pixel in the plurality of images to be identified and measurement unit information, and the depth information of each pixel in the plurality of images to be identified refer to a distance between an object to be identified corresponding to each pixel in the plurality of images to be identified and the camera device that captures the plurality of images to be identified. The measurement unit information includes meter, centimeter, and so on. For example, the depth information of each pixel in the plurality of images to be identified may be 10, and the measurement unit information corresponding to the depth information 10 is meter. A method for generating each of the plurality of target depth images is basically the same as a method for generating the initial depth image, thus it is not repeated here. The computer device obtains a pixel value of each pixel in the plurality of target depth images as the depth information of the corresponding pixel in the plurality of images to be identified, and determines the measurement unit information of the pixel value as a measurement unit information of the depth information.

In the above embodiments, by obtaining the point clouds of the road scene and the spatial coordinate value of each point in the point clouds, since the point clouds and the spatial coordinate value are obtained by lidar, the spatial coordinate value includes a measurement unit information of lidar. The computer device calculates the scaling factor for each point in the point clouds according to the projected depth value, the number of points in the point clouds, and the initial depth value of the initial pixel point corresponding to the projected coordinate value of the initial depth image, since the scaling factor is the average value of the ratios between the plurality of projected depth values and the plurality of corresponding initial depth values, the scaling factor can better represent an overall ratio relation between the plurality of projected depth values and the plurality of corresponding initial depth values relation. The computer device calculates the target depth value for each point in the point clouds according to the scaling factor and the initial depth value. Since the target depth value is generated by scaling the initial depth value according to the scaling factor, an accuracy of the initial projection image generated based on the target depth value can be ensured. In addition, since the spatial coordinate value includes the measurement unit information of the lidar, the generated loss value also includes the measurement unit information. Moreover, the preset depth identification network is adjusted based on the loss value and a pre-trained image identification model is obtained, so as to ensure that the pre-trained image identification model can accurately acquire the measurement unit information of the lidar. The pre-trained image identification model can generate the plurality of target depth images include the measurement unit information, so that a real distance between a vehicle and various objects or obstacles in a surrounding environment can be determined.

Figure 5:
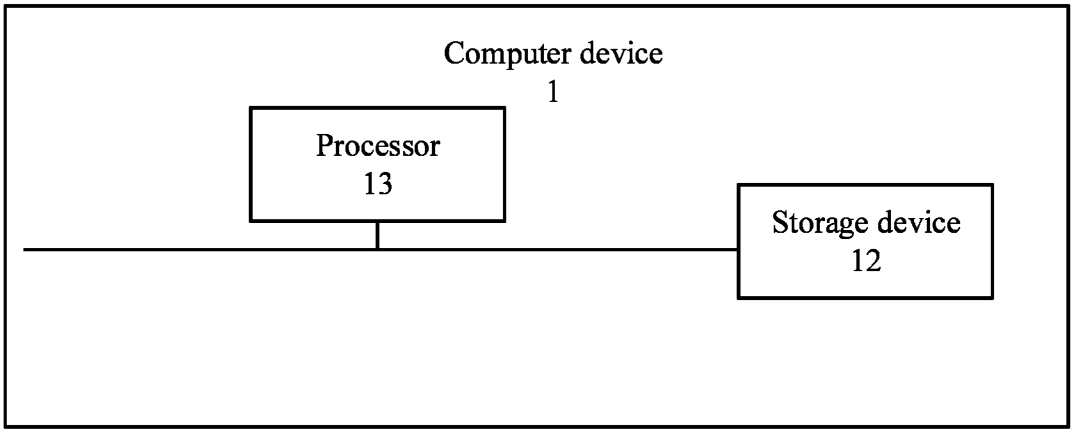
FIG. 5 is a structural diagram of a computer device in an embodiment of the present disclosure.

FIG. 5 is a structural diagram of a computer device in an embodiment of the present disclosure.

The computer device 1 may include a storage device 12, and at least one processor 13. Computer-readable instructions are stored in the storage device 12 and executable by the at least one processor 13.

FIG. 5 is only an example of the computer device 1 and does not constitute a limitation on the computer device 1. Another computer device 1 may include more or fewer components than shown in the figures or may combine some components or have different components. For example, the computer device 1 may further include an input/output device, a network access device, a bus, and the like.

The at least one processor 13 can be a central processing unit (CPU), or can be other general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the computer device 1 and connects various parts of the entire computer device 1 by using various interfaces and lines.

The processor 13 executes the computer-readable instructions to implement a training method of the pre-trained image identification model, such as in block S101-S107 shown in FIG. 2. The processor 13 executes the computer-readable instructions to implement the method for identifying depths of images, such as in block S108-S109 shown in FIG. 4.

For example, the computer-readable instructions can be divided into one or more modules/units, and the one or more modules/units are stored in the storage device 12 and executed by the at least one processor 13. The one or more modules/units can be a series of computer-readable instruction segments capable of performing specific functions, and the instruction segments are used to describe execution processes of the computer-readable instructions in the computer device 1.

The storage device 12 stores the computer-readable instructions and/or modules/units. The processor 13 may run or execute the computer-readable instructions and/or modules/units stored in the storage device 12 and may call up data stored in the storage device 12 to implement various functions of the computer device 1. The storage device 12 mainly includes a program storage area and a data storage area. The storage area for programs may store an operating system, and an application program required for at least one function (such as a sound playback function, an image playback function, for example), for example. The storage area for data may store data (such as audio data, phone book data, for example) created during the use of the computer device 1. In addition, the storage device 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 12 may be an external memory and/or an internal memory of the computer device 1. The storage device 12 may be a memory in a physical form, such as a memory stick, or a Trans-flash Card (TF card), for example.

When the modules/units integrated into the computer device 1 are implemented in the form of independent software functional units, they can be stored in a non-transitory readable storage medium. Based on this understanding, all or some of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 2, the storage device 12 in the computer device 1 stores a plurality of instructions to implement a training method of the pre-trained image identification model, and the processor 13 can execute the multiple instructions to: obtain point clouds of a road scene and a spatial coordinate value of each point in the point clouds, and obtain a first image and a second image of the road scene captured by a camera device; input the first image into a preset depth identification network, and obtain an initial depth image; convert the spatial coordinate value according to a pose matrix generated by the first image and the second image and an internal reference matrix of the camera device, and obtain a projected depth value and a projected coordinate value of each point in the point clouds based on the spatial coordinate value converted; calculate a scaling factor for each point in the point clouds according to the projected depth value, a number of points in the point clouds, and a initial depth value of a initial pixel point corresponding to the projected coordinate value of the initial depth image; calculate a target depth value for each point in the point clouds according to the scaling factor and the initial depth value; generate an initial projection image based on the pose matrix, the internal reference matrix, the target depth value, the second image, and a pixel coordinate value of a target pixel point corresponding to the projected coordinate value in the second image; and calculate a loss value of the preset depth identification network according to the first image, the initial projection image and the second image, and obtain the pre-trained image identification model by adjusting the preset depth identification network based on the loss value.

With reference to FIG. 4, the storage device 12 in the computer device 1 stores a plurality of instructions to implement a method for identifying depths of images, and the processor 13 can execute the multiple instructions to: obtain a plurality of images to be identified; obtain a plurality of target depth images based on the plurality of images to be identified, and determine depth information of the plurality of images to be identified by inputting the plurality of images to be identified into a pre-trained image identification model.

The computer-readable instructions are executed by the processor 13 to realize the functions of each module/unit in the above-mentioned device embodiments, which will not be repeated here.

In the several embodiments provided in the preset embodiment, the disclosed computer device and method can be implemented in other ways. For example, the embodiments of the devices described above are merely illustrative. For example, a division of the modules is based on logical function only, and there can be other manners of division in actual implementation.

In addition, each functional module in each embodiment of the present disclosure can be integrated into one processing module, or can be physically present separately in each unit, or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, not a particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for identifying depths of images using a computer device, comprising:

obtaining a plurality of images to be identified;

obtaining a plurality of target depth images based on the plurality of images to be identified, and determining depth information of the plurality of images to be identified by inputting the plurality of images to be identified into a pre-trained image identification model, a training method of the pre-trained image identification model comprising:

obtaining point clouds of a road scene and a spatial coordinate value of each point in the point clouds, and obtaining a first image and a second image of the road scene captured by a camera device;

inputting the first image into a preset depth identification network, and obtaining an initial depth image;

converting the spatial coordinate value according to a pose matrix generated by the first image and the second image and an internal reference matrix of the camera device, and obtaining a projected depth value and a projected coordinate value of each point in the point clouds based on the spatial coordinate value converted, comprising: obtaining a camera coordinate matrix by multiplying a spatial homogeneous matrix corresponding to the spatial coordinate value by the pose matrix; determining a vertical coordinate value of the camera coordinate matrix as the projected depth value; obtaining a camera pose matrix by multiplying the camera coordinate matrix by the internal reference matrix; and performing a division operation on each element value of the camera pose matrix by the projected depth value, and obtaining the projected coordinate value;

calculating a scaling factor for each point in the point clouds according to the projected depth value, a number of points in the point clouds, and an initial depth value of an initial pixel point corresponding to the projected coordinate value of the initial depth image, the projected depth value comprising measurement unit information;

calculating a target depth value for each point in the point clouds according to the scaling factor and the initial depth value;

generating an initial projection image based on the pose matrix, the internal reference matrix, the target depth value, the second image, and a pixel coordinate value of a target pixel point corresponding to the projected coordinate value in the second image; and calculating a loss value of the preset depth identification network according to the first image, the initial projection image, and the second image, and obtaining the pre-trained image identification model by adjusting the preset depth identification network based on the loss value.

2. The method of claim 1, wherein a calculation formula of the scaling factor is represented as $$C_{scale} = \frac{1}{N_r}\sum_{i=1}^{N_r}\frac{d_{ir}}{d_{ip}},$$

wherein $C_{scale}$ represents the scaling factor, Nr represents the number of points in the point clouds, $d_{ir}$ represents the projected depth value of any point in the point clouds, $d_{ip}$ represents the initial depth value of the initial pixel point corresponding to the any point.

3. The method of claim 1, wherein generating the initial projection image based on the pose matrix, the internal reference matrix, the target depth value, the second image, and the pixel coordinate value of the target pixel point corresponding to the projected coordinate value in the second image further comprises:

constructing a homogeneous coordinate matrix according to the pixel coordinate value of the target pixel point;

obtaining an inverse matrix of the internal reference matrix;

calculating a target coordinate value of the target pixel point according to the pose matrix, the inverse matrix, the internal reference matrix, the homogeneous coordinate matrix, and the target depth value; and obtaining the initial projection image by adjusting the pixel coordinate value of the target pixel point to be a corresponding target coordinate value in the second image.

4. The method of claim 3, wherein a calculation formula of the target coordinate value is represented as:

$$P = K * \text{pose} * Z * K^{-1} * H,$$

wherein P represents the target coordinate value, K represents the internal reference matrix, pose represents the pose matrix, $K^{-1}$ represents the inverse matrix, H represents the homogeneous coordinate matrix, and Z represents the target depth value.

5. The method of claim 1, wherein calculating the loss value of the preset depth identification network according to the first image, the initial projection image and the second image further comprises:

calculating a first pixel difference value between a pixel value of each of pixel points in the first image and a pixel value of corresponding pixel points in the initial projection image;

obtaining a first difference image by adjusting the pixel value of each of pixel points in the first image to be a corresponding first pixel difference value;

calculating a second pixel difference value between the pixel value of each of pixel points in the first image and a pixel value of corresponding pixel points in the second image, and generating a second difference image corresponding to the first image according to the second pixel difference value;

obtaining a target image by adjusting the second pixel difference value of the second difference image according to a comparison result of the second pixel difference value with the corresponding first pixel difference value and a preset value; and calculating the loss value according to a pixel value of each of pixel points in the target image and the corresponding first pixel difference value of corresponding pixel points in the first difference image.

6. The method of claim 5, wherein obtaining the target image by adjusting the second pixel difference value of the second difference image according to the comparison result of the second pixel difference value with the corresponding first pixel difference value and the preset value further comprises:

comparing the second pixel difference value with the corresponding first pixel difference value;

determining a pixel point corresponding to the second pixel difference value in the second difference image as a feature pixel point in response that the second pixel difference value is smaller than the corresponding first pixel difference value;

obtaining the target image by adjusting a plurality of second pixel difference values corresponding to a plurality of feature pixel points in the second difference image to be the preset value.

7. A computer device comprising:

a processor; and a storage device storing a plurality of instructions, which when executed by the processor, cause the processor to:

obtain a plurality of images to be identified;

obtain a plurality of target depth images based on the plurality of images to be identified, and determine depth information of the plurality of images to be identified by inputting the plurality of images to be identified into a pre-trained image identification model, a training method of the pre-trained image identification model comprising:

obtain point clouds of a road scene and a spatial coordinate value of each point in the point clouds, and obtain a first image and a second image of the road scene captured by a camera device;

input the first image into a preset depth identification network, and obtain an initial depth image;

convert the spatial coordinate value according to a pose matrix generated by the first image and the second image and an internal reference matrix of the camera device, and obtain a projected depth value and a projected coordinate value of each point in the point clouds based on the spatial coordinate value converted, comprising: obtain a camera coordinate matrix by multiplying a spatial homogeneous matrix corresponding to the spatial coordinate value by the pose matrix; determine a vertical coordinate value of the camera coordinate matrix as the projected depth value; obtain a camera pose matrix by multiplying the camera coordinate matrix by the internal reference matrix; and perform a division operation on each element value of the camera pose matrix by the projected depth value, and obtain the projected coordinate value;

calculate a scaling factor for each point in the point clouds according to the projected depth value, a number of points in the point clouds, and an initial depth value of an initial pixel point corresponding to the projected coordinate value of the initial depth image, the projected depth value comprising measurement unit information;

calculate a target depth value for each point in the point clouds according to the scaling factor and the initial depth value;

generate an initial projection image based on the pose matrix, the internal reference matrix, the target depth value, the second image, and a pixel coordinate value of a target pixel point corresponding to the projected coordinate value in the second image; and calculate a loss value of the preset depth identification network according to the first image, the initial projection image, and the second image, and obtain the pre-trained image identification model by adjusting the preset depth identification network based on the loss value.

8. The computer device of claim 7, wherein the processor is further caused to:

construct a homogeneous coordinate matrix according to the pixel coordinate value of the target pixel point;

obtain an inverse matrix of the internal reference matrix;

calculate a target coordinate value of the target pixel point according to the pose matrix, the inverse matrix, the internal reference matrix, the homogeneous coordinate matrix and the target depth value; and obtain the initial projection image by adjusting the pixel coordinate value of the target pixel point to be a corresponding target coordinate value in the second image.

9. The computer device of claim 7, wherein the processor is further caused to:

calculate a first pixel difference value between a pixel value of each of pixel points in the first image and a pixel value of corresponding pixel points in the initial projection image;

obtain a first difference image by adjusting the pixel value of each of pixel points in the first image to be a corresponding first pixel difference value;

calculate a second pixel difference value between the pixel value of each of pixel points in the first image and a pixel value corresponding pixel points in the second image, and generate a second difference image corresponding to the first image according to the second pixel difference value;

obtain a target image by adjusting the second pixel difference value of the second difference image according to a comparison result of the second pixel difference value with the corresponding first pixel difference value and a preset value;

calculate the loss value according to a pixel value of each of pixel points in the target image and the corresponding first pixel difference value of corresponding pixel points in the first difference image.

10. The computer device of claim 9, wherein the processor is further caused to:

compare the second pixel difference value with the corresponding first pixel difference value;

determine a pixel point corresponding to the second pixel difference value in the second difference image as a feature pixel point in response that the second pixel difference value is smaller than the corresponding first pixel difference value;

obtain the target image by adjusting a plurality of second pixel difference values corresponding to a plurality of feature pixel points in the second difference image to be the preset value.

11. A non-transitory storage medium having stored thereon at least one computer-readable instructions, which when executed by a processor of a computer device, causes the processor to perform a method for detecting image sizes, the method comprising:

obtaining a plurality of images to be identified;

obtaining a plurality of target depth images based on the plurality of images to be identified, and determining depth information of the plurality of images to be identified by inputting the plurality of images to be identified into a pre-trained image identification model, a training method of the pre-trained image identification model comprising:

obtaining point clouds of a road scene and a spatial coordinate value of each point in the point clouds, and obtaining a first image and a second image of the road scene captured by a camera device;

inputting the first image into a preset depth identification network, and obtaining an initial depth image;

converting the spatial coordinate value according to a pose matrix generated by the first image and the second image and an internal reference matrix of the camera device, and obtaining a projected depth value and a projected coordinate value of each point in the point clouds based on the spatial coordinate value converted, comprising: obtaining a camera coordinate matrix by multiplying a spatial homogeneous matrix corresponding to the spatial coordinate value by the pose matrix; determining a vertical coordinate value of the camera coordinate matrix as the projected depth value; obtaining a camera pose matrix by multiplying the camera coordinate matrix by the internal reference matrix; and performing a division operation on each element value of the camera pose matrix by the projected depth value, and obtaining the projected coordinate value;

calculating a scaling factor for each point in the point clouds according to the projected depth value, a number of points in the point clouds, and an initial depth value of an initial pixel point corresponding to the projected coordinate value of the initial depth image, the projected depth value comprising measurement unit information;

calculating a target depth value for each point in the point clouds according to the scaling factor and the initial depth value;

generating an initial projection image based on the pose matrix, the internal reference matrix, the target depth value, the second image, and a pixel coordinate value of a target pixel point corresponding to the projected coordinate value in the second image; and calculating a loss value of the preset depth identification network according to the first image, the initial projection image, and the second image, and obtaining the pre-trained image identification model by adjusting the preset depth identification network based on the loss value.

12. The non-transitory storage medium of claim 11, wherein generating the initial projection image based on the pose matrix, the internal reference matrix, the target depth value, the second image, and the pixel coordinate value of the target pixel point corresponding to the projected coordinate value in the second image further comprises:

constructing a homogeneous coordinate matrix according to the pixel coordinate value of the target pixel point;

obtaining an inverse matrix of the internal reference matrix;

calculating a target coordinate value of the target pixel point according to the pose matrix, the inverse matrix, the internal reference matrix, the homogeneous coordinate matrix, and the target depth value; and obtaining the initial projection image by adjusting the pixel coordinate value of the target pixel point to be a corresponding target coordinate value in the second image.

13. The non-transitory storage medium of claim 11, wherein calculating the loss value of the preset depth identification network according to the first image, the initial projection image and the second image further comprises:

calculating a first pixel difference value between a pixel value of each of pixel points in the first image and a pixel value of corresponding pixel points in the initial projection image;

obtaining a first difference image by adjusting the pixel value of each of pixel points in the first image to be a corresponding first pixel difference value;

calculating a second pixel difference value between the pixel value of each of pixel points in the first image and a pixel value of corresponding pixel points in the second image, and generating a second difference image corresponding to the first image according to the second pixel difference value;

obtaining a target image by adjusting the second pixel difference value of the second difference image according to a comparison result of the second pixel difference value with the corresponding first pixel difference value and a preset value; and calculating the loss value according to a pixel value of each of pixel points in the target image and the corresponding first pixel difference value of corresponding pixel points in the first difference image.

14. The non-transitory storage medium of claim 13, wherein obtaining the target image by adjusting the second pixel difference value of the second difference image according to the comparison result of the second pixel difference value with the corresponding first pixel difference value and the preset value further comprises:

comparing the second pixel difference value with the corresponding first pixel difference value;

determining a pixel point corresponding to the second pixel difference value in the second difference image as a feature pixel point in response that the second pixel difference value is smaller than the corresponding first pixel difference value;

obtaining the target image by adjusting a plurality of second pixel difference values corresponding to a plurality of feature pixel points in the second difference image to be the preset value.

* * * * *